United States Patent [19]

Mark

[11] 3,953,399

[45] Apr. 27, 1976

[54] FLAME RETARDANT POLYCARBONATE COMPOSITION

[75] Inventor: Victor Mark, Evansville, Ind.

[73] Assignee: General Electric Company, Pittsfield, Mass.

[22] Filed: Dec. 28, 1973

[21] Appl. No.: 429,127

[52] U.S. Cl..................... 260/45.85 H; 260/45.85 S
[51] Int. Cl.$^2$..................... C08K 5/42; C08L 69/00
[58] Field of Search............... 260/45.85 H, 45.85 S, 260/75 S, 860, 47 XA

[56] References Cited
UNITED STATES PATENTS

| | | | |
|---|---|---|---|
| 2,283,236 | 5/1942 | Soday | 260/505 |
| 3,018,272 | 1/1962 | Griffing et al. | 260/75 |
| 3,151,153 | 9/1964 | Keith et al. | 260/507 |
| 3,374,210 | 3/1968 | Muller et al. | 260/79.3 |
| 3,385,811 | 5/1968 | Carrington et al. | 260/29.6 |
| 3,398,212 | 8/1968 | Jackson, Jr. et al. | 260/860 |
| 3,475,372 | 10/1969 | Gable | 260/45.75 |
| 3,535,300 | 10/1970 | Gable | 260/29.1 |
| 3,663,498 | 5/1972 | Uebe et al. | 260/40 |
| 3,775,367 | 11/1973 | Nouvertne | 260/45.9 |

OTHER PUBLICATIONS

Quint et al., Chem. Abs., Vol. 47, 1953, 5446a.

*Primary Examiner*—Donald E. Czaja
*Assistant Examiner*—R. A. White
*Attorney, Agent, or Firm*—Donald M. Papuga; William F. Mufatti

[57] ABSTRACT

A flame retardant polycarbonate composition comprising in admixture an aromatic carbonate polymer and a flame retardant additive which may be the metal salts of sulfonic acids of monomeric and polymeric aromatic carboxylic acids and esters, and mixtures thereof.

6 Claims, No Drawings

FLAME RETARDANT POLYCARBONATE COMPOSITION

This invention is directed to a flame retardant polycarbonate composition and in particular an aromatic polycarbonate containing in admixture therewith a particular flame retardant additive which may be the metal salts of sulfonic acids of aromatic carboxylic acids and esters, and mixtures of these.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.01 to about 10 weight percent based on the weight of the aromatic polycarbonate.

More specifically, the particular additive of this invention is the metal salt of substituted and unsubstituted sulfonic acids of aromatic carboxylic acids and esters and mixtures of these. The metal salt employed in the practice of this invention is either the alkali metal or alkali earth metal salt or mixtures of the metal salts. The metals of these groups are sodium, lithium, potassium, rubidium, cesium, beryllium, magnesium, calcium, strontium and barium.

The sulfonic acids of aromatic carboxylic acids and esters employed in the practice of this invention can be substituted or unsubstituted wherein the substituent consists of an electron withdrawing radical. As employed herein and within the scope of this invention, any of the electron withdrawing radicals can be employed in the practice of this invention. However, preferably, the electron withdrawing radical or substituent employed in the practice of this invention is the halo-, nitro-, trihalomethyl and cyano electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc. 1962 (pages 5, 32 and 85–93). Briefly, the electron withdrawing phenomenon is where the radical has a strong affinity for a negative charge, namely electrons, but still remains covalent and does not form an ion. This is an extremely brief description of this phenomenon and is merely set forth here to describe the electron withdrawing effect. Reference should be made to the texts set forth above.

In the practice of this invention, the types of sulfonic acids employed herein may be either the monomeric or the polymeric form or mixtures of these. When first considering the monomeric form, the metal salt of the unsubstituted and substituted sulfonic acids of aromatic carboxylic acids and esters have the following formula:

$$X_pR(SO_3M)_m(COOY)_nR'_q \qquad \text{I.}$$

wherein X is an electron withdrawing radical, M is a metal which may be selected from the periodic table of either an alkali metal or an alkali earth metal, R is an aryl radical of 1–4 aromatic rings, R' is an organic radical of 1–4 carbon atoms and is either alkyl, alkenyl, alkylene, alkenylene, alkylidene or alkenylidene, Y is a metal described under M or an organic radical of 1–20 carbon atoms and is either alkyl, cycloalkyl, aralkyl, alkenyl, cycloalkenyl, aralkenyl or aryl, m and n are integers of 1–6 and p and q are integers from 0–10.

Actually, while there are many compounds that meet the requirements of Formula I and which offer excellent flame retardant characteristics to an aromatic polycarbonate, the preferred additive employed in the practice of the monomeric form is sodium dimethyl 2,4,6-trichloro-5-sulfoisophthalate. This has the following formula:

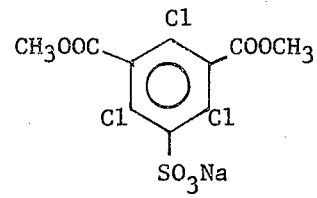

When the polymeric form of the sulfonic acids of the unsubstituted and substituted aromatic carboxylic acid esters is employed in the practice of this invention, it can best be represented by the following formula:

$$[Hal]_p[R(COO)_{2-4}R']_m[SO_3M]_x \qquad \text{II.}$$

wherein Hal is a halogen selected from the group comprising fluorine, chlorine and bromine, R and R' are either aromatic nuclei of 1–4 aromatic rings or aliphatic and cycloaliphatic radicals of from 2–20 carbon atoms, provided that either R or R' must be aromatic, M is a metal which may be selected from the periodic table of either an alkali metal or an alkali earth metal, m is an integer from 2–300, x is an integer from 1–600 and $p$ is an integer from 0–600.

Actually, while there are many compounds that meet the requirements of Formula II, including mixtures of the unsubstituted and substituted aromatic carboxylic acid esters, and which offer excellent flame retardant characteristics to an aromatic polycarbonate, the preferred additives employed in the practice of the polymeric form are polysodium polyethyleneterephthalate polysulfonate, polysodium polybutylene-2,5-dibromoterephthalate polysulfonate and polysodium polybutyleneterephthalate polysulfonate.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

Ninety-nine (99) parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 1 part of a finely ground dehydrated additive listed in Table I by tumbling the ingredients together in a laboratory tumbler.

The resulting mixture is then fed to an extruder, which extruder is operated at about 265°C., and the extrudate is comminuted into pellets.

The pellets are then injection molded at about 315°C. into test bars of about 5 in. by ½ in. by about 1/16-⅛ in. thick. The test bars (5 for each additive listed in the Table) are subject to the test procedure set forth in Underwriters Laboratories, Inc. Bulletin UL-94, Burning Test for Classifying Materials. In accordance with this test procedure, materials so investigated are rated either SE-O, SE-I or SE-II based on the results of 5 specimens. The criteria for each SE rating per UL-94 is briefly as follows:

"SE-O": Average flaming and/or glowing after removal of the igniting flame shall not exceed 5 seconds and none of the specimens shall drip flaming particles which ignite absorbent cotton.

"SE-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"SE-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns." Further, UL-94 requires that all test bars in each test group must meet the SE type rating to achieve the particular classification. Otherwise, the 5 bars receive the rating of the worst single bar. For example, if one bar is classified as SE-II and the other four (4) are classified as SE-O, then the rating for all 5 bars is SE-II.

The results of the different additives within the scope of the instant invention are as follows with a control being the aromatic polycarbonate as prepared above without the additive of the type set forth herein.

TABLE 1.

| Additive (1.0 weight percent) | Flame Out Time Seconds (Avg.) | No. of Drips Per Test Bar | Rating | Remarks |
|---|---|---|---|---|
| CONTROL | 31.6 | 4+ | Burns | |
| Trisodium 5-sulfoisophthalate | 4.1 | 1.4 | SE-II | |
| Disodium 2,5-dichloro-4-sulfobenzoate | 2.8 | 0.8 | SE-II | 2 test bars were SE-O |
| Tripotassium 3,5,6-trichloro-4-sulfophthalate | 3.1 | 0 | SE-0 | |
| Calcium 5-sulfoisophthalate | 8.4 | 1.2 | SE-II | 1 test bar was SE-I |
| Sulfobromophthalein sodium | 3.0 | 4.0 | SE-II | |
| Trisodium 2,4,6-trichloro-3,5-disulfobenzoate | 2.8 | 0.8 | SE-0 | |
| Sodium dimethyl 5-sulfoisophthalate | 12.0 | 1.2 | SE-II | 2 test bars were SE-I |
| Sodium dimethyl 2,4,6-trichloro-5-sulfoisophthalate | 3.2 | 0.8 | SE-0 | |
| Calcium dimethyl 2-chloro-5-sulfoisophthalate | 4.4 | 0.8 | SE-II | 2 test bars were SE-0 |
| Polysodium polyethyleneterephthalate polysulfonate | 4.8 | 1.2 | SE-II | |
| Polysodium polyethylene-2,5-dibromo-terephthalate polysulfonate | 3.0 | 0.8 | SE-0 | |
| Polysodium polybutyleneterephthalate polysulfonate | 5.2 | 2.0 | SE-II | |
| Polypotassium poly(dibromoneopentylene) isophthalate polysulfonate | 4.6 | 1.6 | SE-II | |
| Polysodium phthalic acid-glycerol-polyester polysulfonate | 5.8 | 0.8 | SE-I | |

EXAMPLE II

This Example is set forth to demonstrate the effect of the flame retardant additives of this invention at the lower limits of 0.01 weight percent based on the weight of the polymer composition.

In preparing the test bars for this Example, 99.99 parts of the polycarbonate of Example I is mixed with 0.01 weight percent of the additives listed in Table 2 employing the same procedure. Test bars are then molded using the same procedure employed in Example I. The test bars are subjected to the same test procedure of Example I with the following results:

TABLE 2.

| Additive (0.01 weight percent) | Flame Out Time Seconds (Avg.) | No. of Drips Per Test Bar | Rating | Remarks |
|---|---|---|---|---|
| CONTROL | 31.6 | 4+ | Burns | |
| Trisodium 3,5,6-trichloro-4-sulfo-isophthalate | 5.6 | 3.6 | SE-II | |
| Trisodium 2,4,6-trichloro-3,5-disulfo-benzoate | 8.1 | 4.0 | SE-II | |

EXAMPLE III

This Example is set forth to show the effect of a known commercially available flame retardant additive.

A.

Example I is repeated except that in place of the additives employed therein, only 1 part 1,2,5,6,9,10-hexabromocyclododecane is used herein. The results obtained upon evaluating five (5) test bars are the same as obtained for the Control shown in Table 1 above.

B.

Part A. above is repeated but using 5 weight percent of the above additive, namely 1,2,5,6,9,10-hexabromocyclododecane. The results obtained are the same as obtained in Part A. above.

C.

Part A. above is repeated but using 10 weight percent of the above additive, namely 1,2,5,6,9,10-hexabromocyclododecane. At this level of additive, test bars are rated SE-II. However, the polycarbonate is badly degraded as evidenced by severe dark streaking of the molded test bars, which degradation does not occur with the additives of the instant invention.

EXAMPLE IV

Example III is repeated except that hexabromobiphenyl is employed herein. The results obtained are essentially the same as those of Example III.

EXAMPLE V

Example III is repeated except that the additive employed herein is a combination of antimony oxide and a material which is a mixture of polychlorinated biphenyl (Aroclor by Monsanto Company). The proportion of the ingredients of the additive employed in this example is based on 3 parts of chlorine per 1 part of antimony. The results obtained at 1 weight percent and 5 weight percent amounts are the same as in Example III.

However, at the higher amount, namely 10 weight percent, flame retardancy effect is noted, but with, again, severe degradation of the polycarbonate, as evidenced by the substantial reduction in the intrinsic viscosity of the molded test bars. As molded, the intrinsic viscosity of the test bars with 1 weight percent of the above additive is about 0.50. The intrinsic viscosity of the molded test bars containing 10 weight percent of the flame retardant additive of this Example is 0.253. This shows the severe degradation of the polycarbonate when employing this type of well known flame retardant.

In the practice of this invention, aromatic carbonate polymers are rendered flame retardant by the addition of certain particular additives which are the metal salts of substituted and unsubstituted sulfonic acids of aromatic carboxylic acids and esters and which include mixtures of these. The amount of the additives employed in the practice of this invention may vary from 0.01 to up to that amount which does not cause degradation of the physical properties of the carbonate polymer. This is generally up to about 10 weight percent based on the weight of the aromatic carbonate polymer but may be higher. The amount of the additive to be employed can also be a function of the degree of flame retardancy desired.

It is not exactly understood how the additive of this invention functions or how such minor amounts can act as an effective flame retardant for the aromatic carbonate polymer. Analysis of the composition of this invention after being subjected to a fire temperature of about 600°C. showed an unusually high percentage of remaining char. This leads one to hypothesize that the additive may act as a cross-linking agent when the aromatic carbonate polymer is subjected to fire temperatures. However, it is emphasized that this is only theory and should not be construed as actually occurring.

As indicated previously, the additive of the instant invention comprises the alkali or alkali earth metal salts of the substituted and unsubstituted sulfonic acids of aromatic carboxylic acids and esters and mixtures thereof. While a great number of such salts are set forth in the tables of the Examples of the instant invention, these are only a representative sample of the additives of this invention. The sodium, calcium, magnesium, potassium, strontium, lithium, barium, rubidium and cesium salts of other sulfonic acids of aromatic carboxylic acids and esters can be employed in place of those of the Examples with the same effective flame retardancy being achieved. These other metal salts of aromatic carboxylic acids and esters are obtained for the following sulfonic acids:

diethyl 4-sulfonaphthalene-2,6-dicarboxylate
dimethyl 9,10-dichloro-4-sulfo-anthracene-1,5-dicarboxylate
dimethyl 9,10-dihydroanthracene-1,5-dicarboxylate
trimethyl 5-sulfotrimellitate
methyl 1,1-dichloro-2(4'-sulfophenyl)-2-phenyl-4''-carboxylate
methyl 2,3,5,6-tetrafluoro-5-sulfobenzoate
butyl 3-trifluoromethyl-5-sulfobenzoate
terephthalic acid-cyclohexanedimethanol polyester polysulfonic acid
terephthalic acid-ethylene glycol-butanediol copolyester polysulfonic acid
succinic acid-bisphenol-A copolyester polysulfonic acid In the practice of this invention, the additive is generally prepared by well known methods in the art. For example, one such well known method involves taking an aromatic carboxylic acid and subjecting it to sulfonation using either sulfuric acid, chlorosulfonic acid, fuming sulfonic acid or sulfur trioxide. These reactions can be carried out at room temperature or at elevated temperatures such as about 50°C. The salt is then prepared by adding the proper alkaline reagent in sufficient amount to make the neutral salt. The sale is then recovered by precipitation or by distillation of the solvent.

In the case of a trihalomethyl electron withdrawing substituent, such as trifluoromethyl electron withdrawing substituent for example, it is best to start with the prepared trifluoromethyl aromatic carboxylic acid and then sulfonate as above, as well as preparing the salt thereof.

In the practice of this invention, any of the aromatic polycarbonates can be employed herein. However, particularly useful are the aromatic polycarbonates prepared by reacting a dihydric phenol, such as bisphenol-A (2,2'-bis(4-hydroxyphenyl) propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane, Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, and an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

As stated previously, mixtures are also included within the scope of the instant invention. These mixtures include mixtures of the various metal salts set forth herein of the monomeric and polymeric substituted and unsubstituted sulfonic acids of carboxylic acids and of the esters. They also include mixtures within either the said monomeric or polymeric form of the additive. The mixtures have shown certain advantages, as for example, SE-O rating for 5 test bars and essentially no drips per test bar.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant aromatic carbonate polymer composition comprising in admixture an aromatic carbonate polymer and a minor amount of a metal salt of monomeric substituted and unsubstituted sulfonic acids of aromatic carboxylic acids and esters, and mixtures thereof, wherein said metal salts thereof are selected from the group consisting of alkali metals and alkali earth metals, and mixtures of these salts and said substituent on the metal salt of the substituted sulfonic acids of aromatic carboxylic acids and esters is selected from the group consisting of an electron withdrawing radical and mixtures of electron withdrawing radicals.

2. The composition in claim 1 wherein the metal salt of the substituted and unsubstituted sulfonic acids of monomeric aromatic carboxylic acid salts and esters have the following formula:

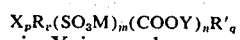

wherein X is an electron withdrawing radical, M is a metal selected from the group consisting of alkali metals and alkali earth metals, R is an aryl radical of 1–4 aromatic rings, R' is an organic radical selected from the group consisting of alkyl, alkenyl, alkylene, alkenylene, alkylidene and alkenylidene radicals of 1–4 carbon atoms, Y is a metal selected from the group consisting of alkali metals and alkali earth metals, or an organic radical which is selected from the group consisting of alkyl, cycloalkyl, aralkyl, alkenyl, cycloalkenyl, aralkenyl and aryl radicals of 1–20 carbon atoms, $m$ and $n$ are integers of from 1–6, $p$ and $q$ are integers of from 0–10, and $v$ is an integer of from 1–10.

3. The composition of claim 2 wherein the electron withdrawing radical is chlorine.

4. The composition of claim 2 wherein the metal salt is disodium 2,5-dichloro-4-sulfobenzoate.

5. The composition of claim 2 wherein the metal salt is sodium dimethyl 2,4,6-trichloro-5-sulfoisophthalate.

6. The composition of claim 2 wherein the metal salt is trisodium 2,4,6-trichloro-3,5-disulfobenzoate.

* * * * *